United States Patent [19]
Russ

[11] Patent Number: 5,862,125
[45] Date of Patent: Jan. 19, 1999

[54] AUTOMATED RESTORATION OF UNRESTORED LINK AND NODAL FAILURES

[75] Inventor: Will Russ, Dallas, Tex.

[73] Assignee: MCI Communication Corporation, Washington, D.C.

[21] Appl. No.: 483,579

[22] Filed: Jun. 7, 1995

[51] Int. Cl.[6] .................................................. H04J 1/16
[52] U.S. Cl. .......................................... 370/228; 340/827
[58] Field of Search .......................... 370/16, 16.1, 94.1, 370/94.2, 60, 60.1, 389, 216, 218, 221, 222, 223, 224, 225, 227, 228, 237; 379/221; 340/825.01, 827; 395/181, 183.01

[56] References Cited

U.S. PATENT DOCUMENTS

| | | | |
|---|---|---|---|
| 4,725,834 | 2/1988 | Chang et al. | 370/451 |
| 4,991,204 | 2/1991 | Yamamoto et al. | 370/16 |
| 5,069,521 | 12/1991 | Hardwick | 370/228 |
| 5,265,092 | 11/1993 | Soloway et al. | 370/238 |
| 5,459,716 | 10/1995 | Fahim et al. | 370/16 |
| 5,469,428 | 11/1995 | Tokura et al. | 370/224 |
| 5,495,471 | 2/1996 | Chow et al. | 370/221 |

*Primary Examiner*—Dang Ton

[57] ABSTRACT

A method and apparatus for restoration of unrestored links and nodal failures utilizes a combination of link and path restoration schemes and most existing message types. This invention begins by using a link restoration scheme, when a fault is detected, to designate a pair of custodial sender and chooser. The conventional link restoration scheme then seeks to find an alternate route to reroute the disrupted traffic. When no alternate route is found after a given time period, a special signal is sent out to notify the network that a path restoration is to take place. The communications path on which the failure occurred is identified. Thereafter, data that was stored in the nodes is retrieved to identify the two ends nodes of the communications path. A restoration process then takes place to find alternate paths to replace the failed communications path. Upon termination of the path restoration scheme after a predetermined time period, the most efficient alternate path is selected to restore the traffic by bypassing the location on the communications path where the failure occurred. Since fault isolation is not required, the present invention can be used to restore traffic due to a nodal failure.

22 Claims, 6 Drawing Sheets

AUTOMATED RESTORATION OF UNRESTORED LINK AND NODAL FAILURES

RELATED APPLICATIONS

This invention relates to an application by Russ et al. entitled Method and System for Resolving Contention of Spare Capacity Circuits of a Telecommunication Network (Docket No. RIC-95-005), to be assigned to the same assignee as the instant invention and filed on Jun. 6, 1995 having Ser. No. 08/468,302 now U.S. Pat. No. 5,657,320. The disclosure of this related application having the '005 docket number, incorporated by reference herein, may be reviewed for an understanding of the concepts of distributed restoration algorithm schemes. The invention also relates to an application by W. Russ entitled "System and Method for Resolving Substantially Simultaneous Bi-directional Requests of Spare Capacity" (Docket No. RIC-95-009), filed concurrently herewith having Ser. No. 08/483,578. This invention is further related to an application by Russ et al. entitled "Automated Path Verification for SHN-Based Restoration" (Docket No. RIC-95-010), to be assigned to the same assignee as the instant invention and filed concurrently herewith having Ser. No. 08/483,525, now U.S. Pat. No. 5,623,481. This invention is furthermore related to an application by J. Shah entitled "Method and System for Identifying Fault Locations In a Communications Network" (Docket No. RIC-95-022), to be assigned to the same assignee as the instant invention and filed concurrently herewith having Ser. No. 08/481,984, now U.S. Pat. No. 5,636,203. In addition, reference may also be had to U.S. Pat. No. 5,495,471 entitled System and Method for Restoring a Telecommunications Network Based on a Two Prong Approach by Chow et al. The disclosure of the '471 patent is incorporated by reference herein.

FIELD OF THE INVENTION

This invention relates to restoration of a telecommunications network and more particularly to an improvement in the restoration of a network having a nodal failure without the need for fault isolation.

BACKGROUND OF THE INVENTION

In distributed restoration algorithms (DRA), and particularly the self healing network (SHN) restoration of a telecommunications network due to failures in the network, automated restoration of nodal failures could not be achieved. For example, in the SHN scheme as defined by W. D. Grover in U.S. Pat. No. 4,956,835, if a particular node fails, the nodes adjacent thereto would begin a sender/chooser arbitration. One of these adjacent nodes becomes a sender while the other becomes a chooser. However, the failed node could not respond as a chooser to the adjacent sender node. Alternatively, the failed node, if acting as a sender, would not send out any restoration signatures or messages to its adjacent chooser node. Accordingly, the SHN scheme would eventually time out without anything happening. In other words, restoration would not take place. To get a more thorough understanding of SHN, the reader should peruse the disclosure of the '835 patent, incorporated by reference herein.

A need therefore arises for a scheme of restoring traffic when there is a failure in a node so that traffic that would pass through that node could be restored.

BRIEF DESCRIPTION OF THE PRESENT INVENTION

The present invention method, and system therefor, restores traffic traversing through a failed node by using a combination, or hybrid, link and path restoration scheme. In particular, upon detection of a failure in a telecommunications network, the information stored in the nodes adjacent to the failure is used to perform a link restoration. One of the adjacent nodes is designated a sender, or pseudo-sender, while the other adjacent node is designated the chooser, or pseudo-chooser, node. A conventional link restoration scheme is then effected between the pseudo-sender and chooser nodes until a time-out, probably from the pseudo-sender node, causes the link restoration operation to cease. The pair of pseudo-sender and chooser nodes may also be referred to as a custodial pair of nodes.

If no alternate route is found after the sender time-out has occurred, then a special signal is sent downstream to the other nodes of the network to inform them that a path restoration scheme is to proceed. In order to do the path restoration, the two end nodes of the communications path to which the failure affected are identified by means of the information carried by a path verification signal stored in the nodes of the network. Once the communications path where the fault occurred and the end nodes of that communication path are identified, one of the end nodes is then designated a second iteration sender node while the other a second iteration chooser node. The specific access/egress port for connecting the communications path on each of the end nodes is likewise identified via manual or automatic provisioning and serves to identify that node as an access/egress node.

Thereafter, a path restoration scheme is performed between the second iteration sender and chooser end nodes. If alternate paths are found between the two end nodes within a given time period, then the best path is selected for restoring the traffic interrupted by the malfunctioning of the node (or due to any other failure to restore the link by the link-SHN algorithm).

It is therefore an objective of the present invention to provide a method and a system for restoring traffic due to a node failure.

It is moreover another objective of the present invention to provide a scheme for restoring traffic without any need to isolate the fault that caused the communications failure.

It is yet another objective of the present invention to provide a method of restoring traffic interrupted by a nodal failure without any need to utilize additional equipment.

BRIEF DESCRIPTION OF THE DRAWINGS

The above mentioned objectives and advantages of the present invention will become more apparent and the invention itself will be best understood by reference to the following description of an embodiment of the invention taken in conjunction with the accompanying drawings, wherein.

DETAILED DESCRIPTION OF THE PRESENT INVENTION

Figure 1:
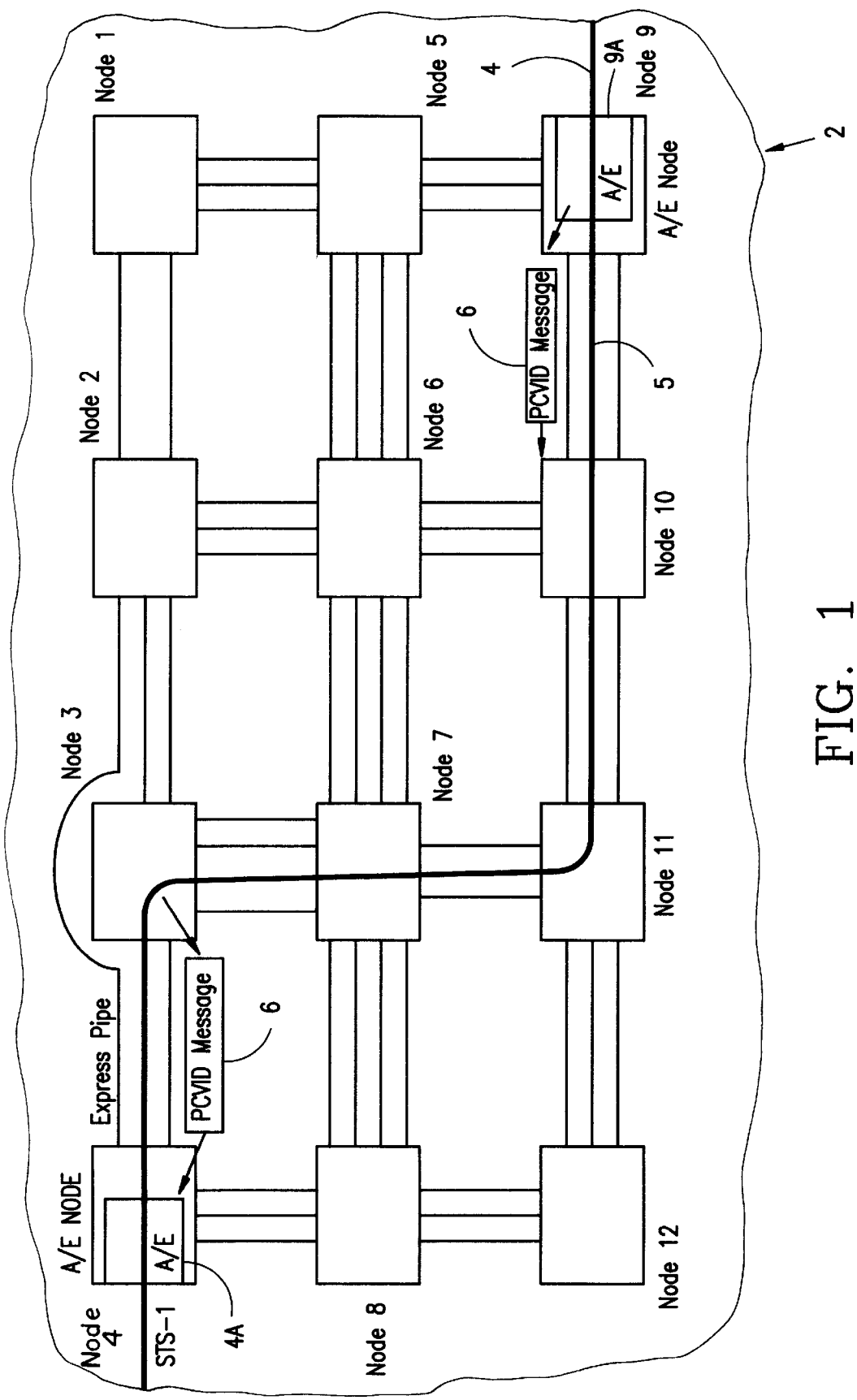
FIG. 1 As a block diagram illustrating the telecommunications network of the instant invention in which a plurality of nodes are shown to be connected and a particular communications path is shown to be traversing through a number of those nodes.

With reference to FIG. 1, an exemplar telecommunications network 2 is shown to have a plurality of nodes, designated node 1 to node 12, interconnected as shown. A communications path, configured in a synchronous transport signal (STS) format as a STS-1 and designated 4, is shown to traverse between node 9 and node 4—passing through nodes 10, 11, 7 and 3. As shown in FIG. 1, node 9 and node 4 may be considered as the end nodes of network 2 and the communications path would pass out of network 2 into another telecommunications network, or some other nodes which may not be equipped for distributed restoration. In other words, nodes 1–12 shown in FIG. 1 may be considered as a dynamic transmission network restoration (DTNR) domain which in turn is connected to the outside, in this case, by communications path 4, via end nodes 4 and 9. Accordingly, each of end nodes 4 and 9 may be considered as an access/egress node and each of those nodes in turn has an access/egress port, designated 4a and 9a for nodes 4 and 9, respectively, for carrying out the actual interfacing between the DTNR domain and the outside environment.

In essence, the traffic being routed on a communications path such as 4 gets routed into a DTNR domain by first entering an access/egress port such as 4a or 9a, and then is cross-connected to a working link which in turn is connected to an adjacent node. See for example link 5 shown interconnecting node 9 to intermediate node 10. And by the interconnections of working links between the intermediate nodes which together form the path upon which traffic traverses, a communications path is configured.

As further shown in FIG. 1, a message, identified as a path verification circuit identification (PVCID) message 6 in this embodiment, is sent out from the access/egress (A/E) port 9a of node 9 to A/E port 4a along path 4. A PVCID message essentially is a message that has two fields, a 4 bit message type field that identifies the message as being a PVCID message, and a PVCID field which identifies that node 9 is the end node and that A/E port 9a is the access/egress port for the communications path in end node 9. Node 9 knows itself to be an end node. When PVCID message 6 is sent out along with the traffic to the other nodes of the network, when it arrives at the far end, i.e. end node 4, node 4 likewise will recognize that it is the other end node for the communications path and that its A/E port 4a is the other access/egress port for the communications path.

When received, the information carried by the PVCID message is stored by node 4 as the circuit ID of the STS-1 path that traverses through the network. The respective node IDs and port IDs of end nodes 4 and 9 are thus exchanged. In essence, therefore, for the instant embodiment the PVCID message is a message that informs the nodes of the network the end nodes of a circuit path. Further note that the PVCID message 6 is retransmitted by the intermediate nodes, such as nodes 10, 11, 7 and 3, until it finally reaches node 4. This is represented by the PVCID message shown between node 3 and node 4.

In the FIG. 1 example embodiment, node 4 has a lower number than node 9. Thus, using the conventional arbitration method based on numbers, node 4 would be considered a second iteration sender and node 9 a second iteration chooser for a path restoration scheme.

Figure 2:
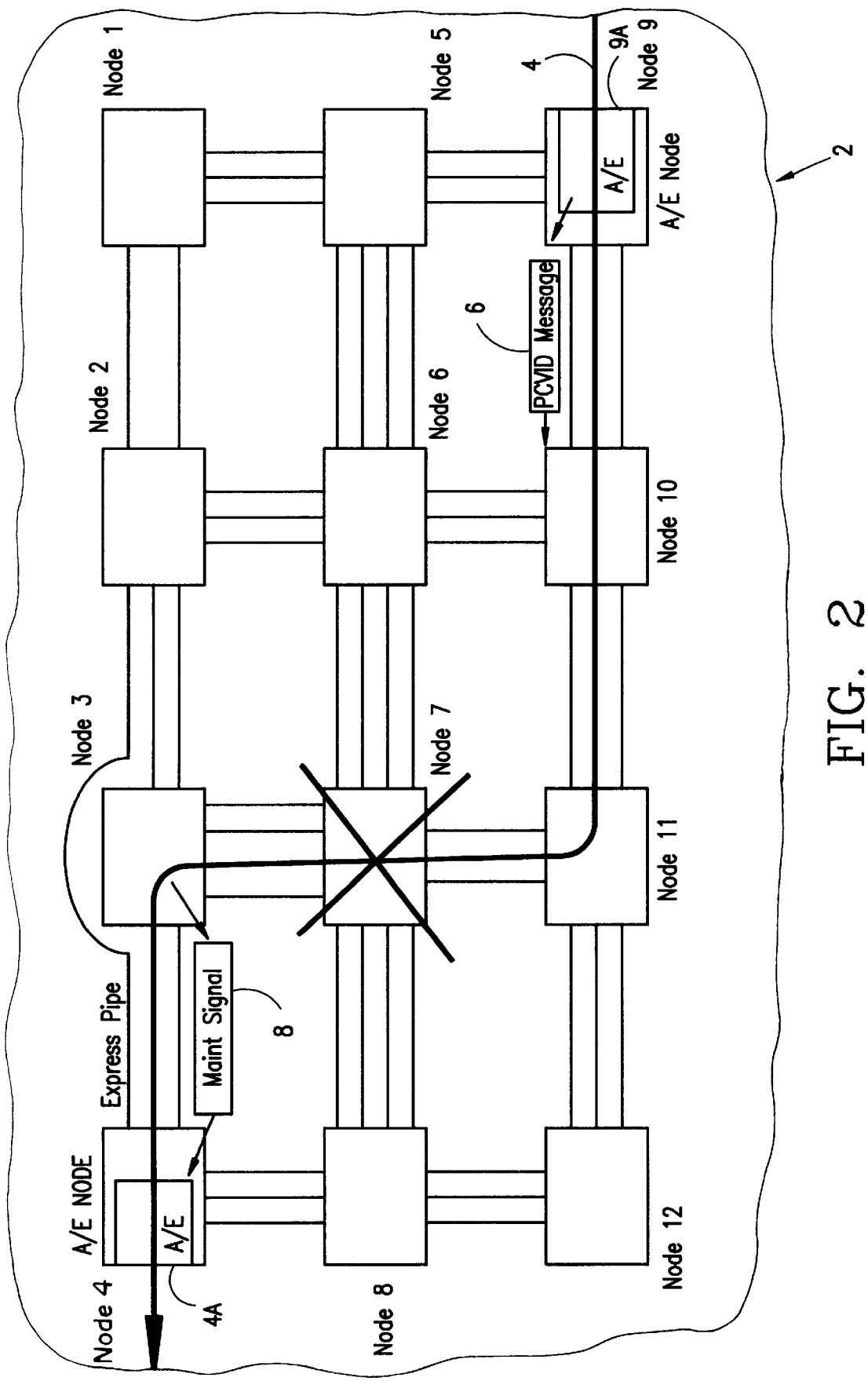
FIG. 2 is the same illustration shown in FIG. 1 but with one of the nodes having now failed.

With reference to FIG. 2, the telecommunications network 2 of FIG. 1 is shown to have a failure occurring at node 7. In other words, node 7 has failed. In this instance, if a self healing network (SHN) scheme is used to attempt to restore traffic, the restoration would not be successful since there is no node such as that disclosed in the '835 patent to begin the restoration process. This is because node 7 is dead. Thus, the time-out for the restoration would occur before any restoration can take place.

The instant invention achieves restoration of the interrupted traffic by first designating the nodes adjacent to the failed node as a custodial pair of nodes, or pseudo-sender and pseudo-chooser nodes. In the embodiment shown in FIG. 2, node 3 and node 11 are therefore the custodial nodes that would detect the failure that occurred at node 7. Bear in mind, however, all that nodes 3 and 11 do is a loss of signal from node 7 by means of their respective line transmission element (LTE), shown in FIG. 3, for example which inform them that there has been a loss of signal from downstream/upstream. In other words, whether it is a fiber cut or a nodal failure, node 3 would only sense a loss of signal downstream from it, i.e. from the direction of node 7. Similarly, when there is a failure from the direction of node 7 irrespective of whether it is a fiber cut or a node failure, node 11 would only detect a loss of signal upstream thereof.

As the usual practice in DTNR, a signal is sent out by the node that senses a failure downstream to quiet the downstream alarms. The instant invention, however, would convert this special signal, an alarm indication signal (AIS), to a signal for initiating restoration of the traffic. More on that later.

Once node 3 and node 11 each have identified that there is a failure, an arbitration process would take place between the two nodes so that, for example, since node 3 has a smaller number than node 11, node 3 would consider itself the sender while node 11, having a higher number than node 7, would consider itself the chooser. In other words, node 3 would think of itself the sender while node 11 would consider itself the chooser for node 7. Thus, node 11 would wait for flooding from node 7 which would never come, since node 7 is dead. At the same time, node 3, considering itself to be the sender to node 7, would begin flooding restoration signals or signatures to the various links for finding an alternate route to node 7. However, since node 7 is dead, it would not be responsive. Accordingly, after a predetermined time period, node 3 would time-out. For the instant invention, therefore, a first iteration of link restoration takes place by the nodes adjacent to the failed node until both of the adjacent custodial nodes time-out. A variant of the invention envisions that only one time-out, namely the time-out of the sender, is needed insofar as that would be sufficient to terminate the operation of the link restoration phase of the instant invention.

As was mentioned previously, an alarm quieting or squelching signal is sent by the adjacent nodes to quiet the downstream alarms in network 2. This alarm quieting signal could be considered as the AIS signal for the instant invention. For the instant invention, asserted to the AIS signal is an ISF signal (or the AIS signal is converted into a new maintenance signal), designated 8 in FIG. 2. The thus newly converted signal has the purpose of transmitting to node 4 of the network the information that there are unrestored links upstream of node 3. In other words, for the circuits and nodes connecting the communications path 4 beyond node 3, information is provided that there is at least one unrestored link upstream of node 3 and that this unrestored link may be caused by a fiber cut or a nodal failure or anything. Putting it differently, the link restoration scheme did not work. The same broadcasting of the special signal of course is done by node 11 upstream towards the links and nodes along communications path 4 to inform them that there is an unrestored link downstream of node 11.

With the failure of the link restoration scheme, the second phase of the instant invention restoration scheme commences as follows. The special maintenance signal 8 which is routed upstream/downstream is configured to have a format that will be recognized at any time by the access/ egress node, i.e. the end node with the access/egress port communicatively connected to the outside of the DTNR domain. A second iteration flooding then takes place for restoring the path to which the failure has interrupted. Putting it differently, a path restoration now takes place.

Thus, once node 4 has received signal 8, it knows that the end node of the communication path 4 whose traffic was interrupted by a failure that occurred upstream of node 3 is node 9 (from its received PVCID on that circuit). And by the same conventional number arbitration process it knows that it now is the sender since it has a lower number than the far end node 9. Putting it differently, the sender and the chooser for the path restoration scheme now are the two end nodes 4 and 9, respectively.

Node 4 would begin flooding the circuits of the network by sending second iteration flooding messages onto every STS-1 spare and open links. For the exemplar embodiment shown in FIG. 2, a communications path is considered to be connected by the different STS-1 circuits connecting the various nodes. Note however that the span that connects each node, i.e. an OC-12 circuit, in fact contains 12 STS-1s, and that not all 12 STS-1s go from one node to another node. Rather, the traffic is groomed so that some of the 12 STS-1s of the OC-12 fiber would go to one node while others would go to other nodes due to the interconnection within the cross-connect switch of each node.

Having designated a sender and chooser, the restoration scheme of the instant invention proceeds like conventional SHN. In essence, restoration signatures or messages are sent from sender node 4 to its adjacent nodes through various circuits. For example, restoration messages may be sent from node 4 to node 2 via the express pipe connecting node 4 to node 2. At the same time, restoration message are sent from node 4 to node 3 per the link that makes up a portion of communications path 4. Restoration signals are also sent by node 4 to node 8. Thereafter, these intermediate nodes, namely nodes 3, 2 and 8, would retransmit those restoration signals to their respective adjacent nodes along spare circuits or links interconnecting those nodes, until those restoration signals reach end node 9, which is the chooser node. Node 9, upon receipt of the first of the second iteration flooding signals, would transmit a complementary or complement reverse-linking signal back through the spare circuits that had already been flooded with the path restoration signals originated from sender node 4, so that paths may be established between node 4 and node 9.

A conventional method of selecting the best path for restoring the interrupted traffic may be based on hop counts so that generally the shortest restoration path is chosen to reroute the traffic interrupted between nodes 3 and 11. Other types of messages that are used in this path restoration iteration include connect message and release message as in DTNR. And as long as an alternate path is found prior to termination of the predetermined time period allotted for the second iteration flooding, i.e. the path restoration, the interrupted traffic can be restored. Note that the hop count limit placed on the messages for the second iteration path restoration is much higher than the hop count placed on the first iteration link restoration, since the former deals with path restoration which extends from the two end nodes of a communications path while the latter deals with link restoration which entails only finding an alternate route for adjacent nodes.

For this invention, fault isolation is not performed, or necessary, since the instant invention method does not care to find out where the fault occurred or why a link was unrestored, or that the fault is caused by a nodal failure. In other words, none of that matters. However, even though fault isolation is not performed in the instant invention method, such fault isolation can in fact easily be accomplished through alarm recording of each node back to a centralized network management system. Such fault isolation could then be used for the purposes of troubleshooting, repair and maintenance. But the important thing to note here is that such fault isolation is not required for the instant invention method which automatically restores the traffic due to a nodal failure.

Figure 3:
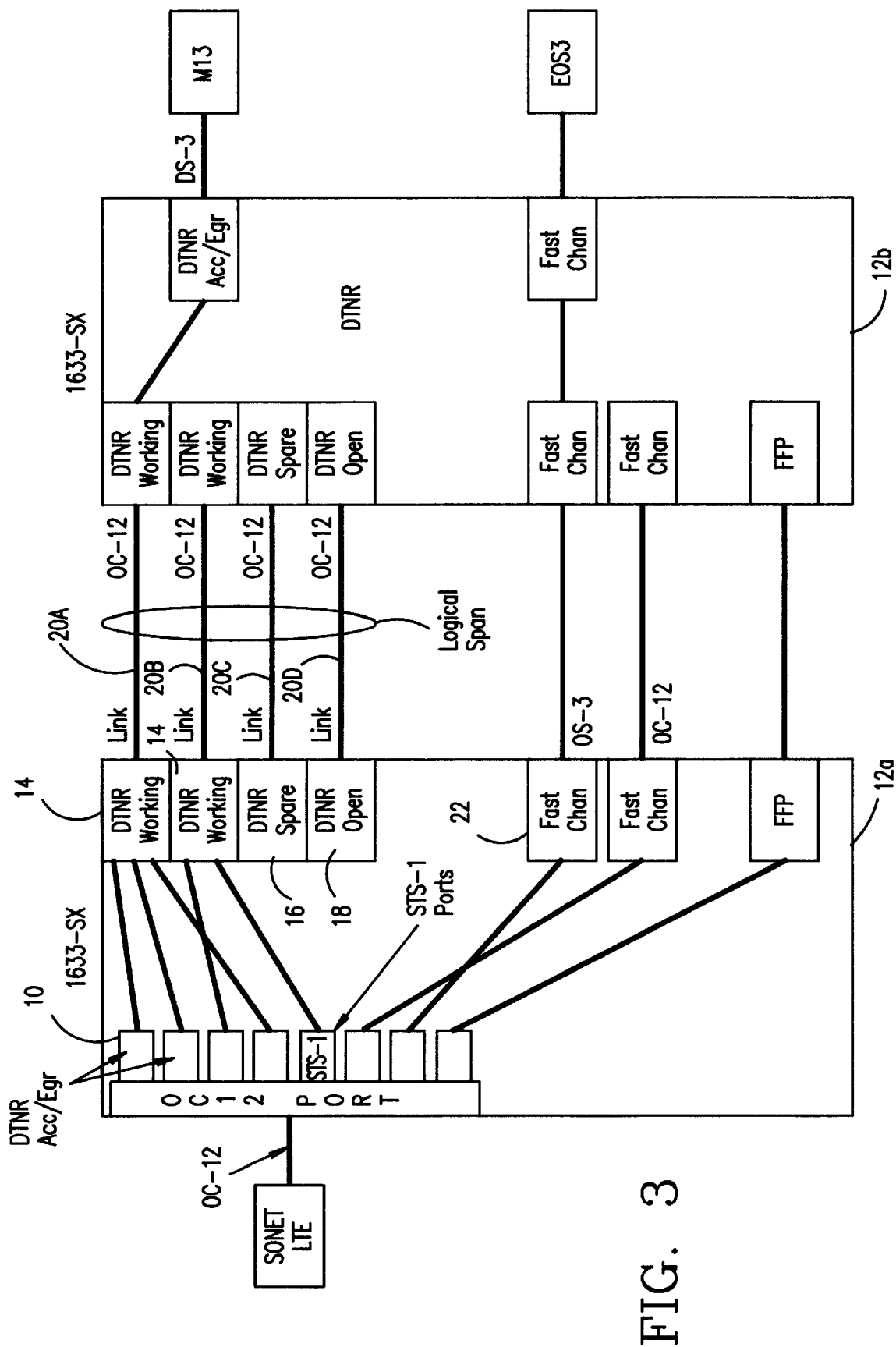
FIG. 3 a simplified block diagram illustrating two of the cross-connect switches, each representing one of the nodes, interconnected to each other.

FIG. 3 shows two adjacent connected cross-connect switches 12a and 12b each of which may, for example, be a digital cross-connect switch made by the Alcatel Company having manufacturing number 1633-SX. As shown, each of the cross-connect switches (DCS) has a number of DTNR access/egress ports, in the form of interface cards, designated 10. Each of these access/egress ports may be interfaced by a STS-1 circuit. As shown, each DCS 12 has two working link interfaces 14, a spare interface 16 and an open interface 18. Respective links 20a and 20b connect the working interfaces of both digital cross-connect switches 12. Likewise, link 20c connects the spare interfaces 16 of both digital cross switches while link 20d connects the open interfaces of both digital cross-connect switches. A processor (not shown), in each of the DCSs, controls the operations of the digital cross-connect switch and its various interfaces. A memory (also not shown) stores the instructions and other information necessary for the operation of each cross-connect switch.

For the digital cross-connect switches shown in FIG. 3, it suffices to state that there are two channel interfaces 22 in each of the switches for providing a different type of restoration, namely a real time restoration (RTR) platform between the nodes. RTR is a restoration scheme that is different from the DTNR restoration scheme of the instant invention, and thus will not be further discussed herein.

Assume that digital cross-connect switch 12a is end node 4 of FIG. 2. Then the output from digital cross-connect switch 12a would be provided to a fiber line terminating equipment (LTE) which in turn forwards, i.e. transports, the output of communications path 4 to a working link outside of the DTNR network 2 shown in FIG. 2.

Figure 4A:
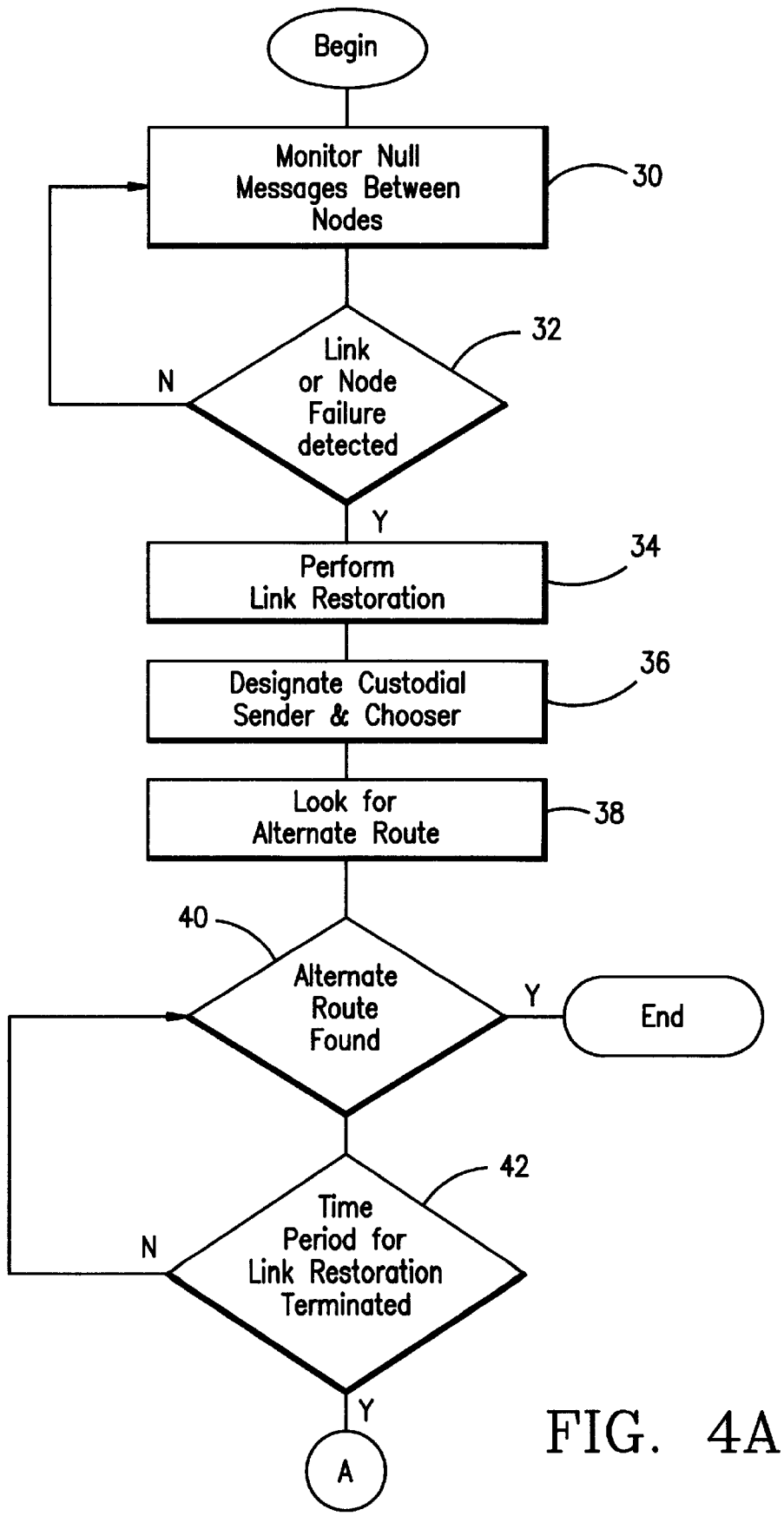
FIGS. 4A–4C provide a flow chart illustrating the operation of the instant invention.
Figure 4B:
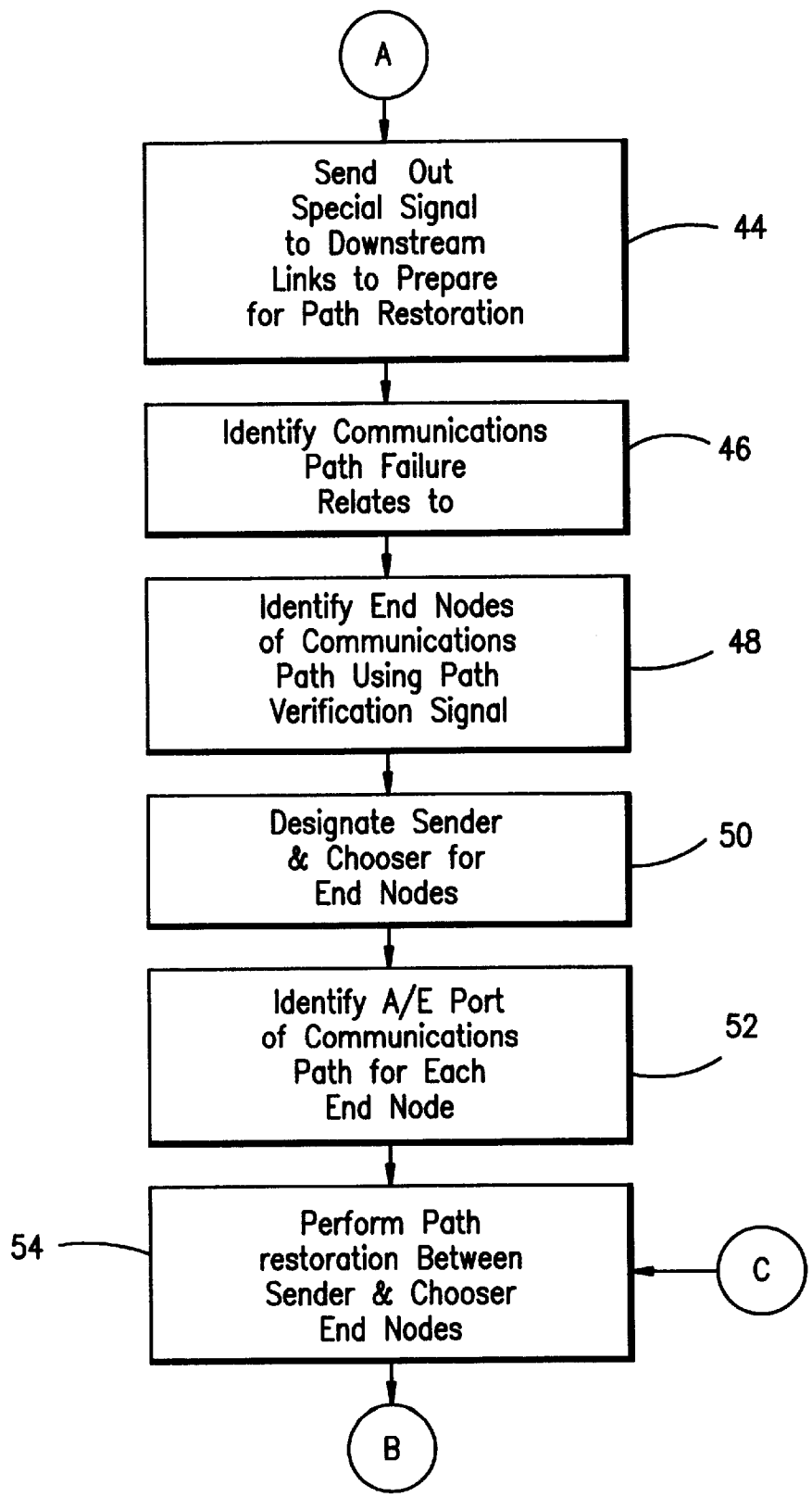
Figure 4C:
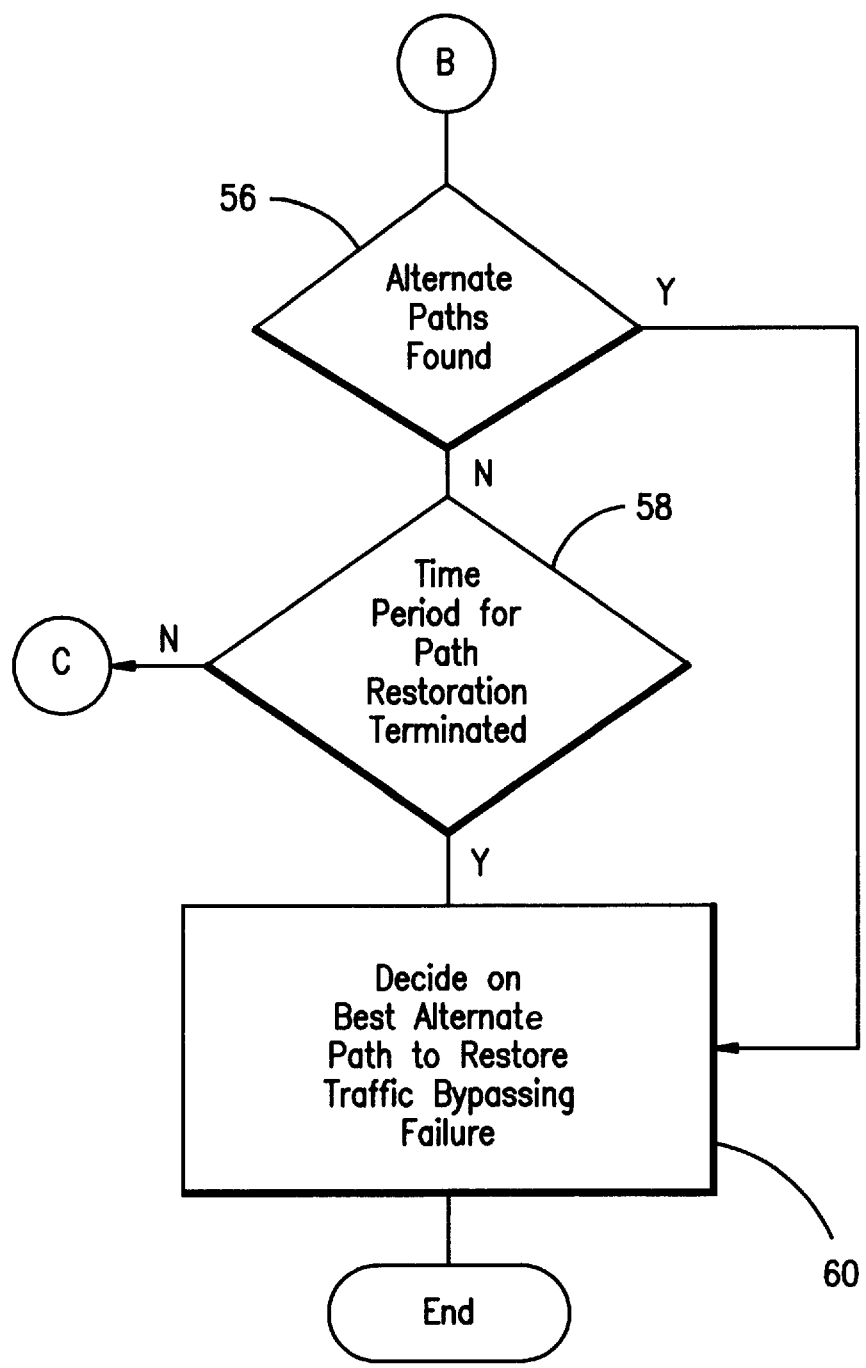

The operation of the instant invention method and system is illustrated by the flow diagram shown in FIGS. 4A–4C. As shown, the different nodes would monitor null messages between the nodes in block 30. These null messages in essence are exchanges between adjacent nodes to provide them information on the availability of the working, spare and open links. The null messages identify which node the receiving port is connected to by sending/receiving a transmitting node ID. In addition, the link ID is also identified by the null messages. This enables both nodes next to a fiber cut to cross-connect the proper circuit into a given restoration route. In other words, it provides a connection map for the system. And since the null messages are sent periodically, the identification of the logical spans is updated with every message arrival and the map is likewise updated. Thus, prior to any failure, identification of the nodes and their interconnecting links, including which links are available for restoration, are identified by the null messages.

Having thus set up the interrelationship between adjacent nodes, the method then proceeds to the next operation of monitoring for a failure, or interruption of signal, link or node by each node of its adjacent nodes in block 32. If no failure is detected, the process returns to block 37 to continue to monitor the null messages and await any detection of failure.

If a failure is detected, link restoration is performed in block 34. There a conventional link based restoration may be performed to find a route to reroute the traffic interrupted between two adjacent nodes. With this link restoration, a sender and chooser are designated for the adjacent nodes, in this instance a pair of custodial nodes that bracket the failure. In other words, for the instant invention, since it does not matter whether the fault is a nodal failure, a fiber cut or whatever, the first iteration link restoration is strictly based on the fact that the nodes on either side of the fault has identified the fault. Thus, even though the sender and chooser nodes are not adjacent nodes in the strictest sense for the instant invention embodiment, they nonetheless are designated as custodial sender and chooser nodes in block 36.

Thereafter, the process attempts to find an alternate route for carrying the traffic that has been interrupted in block 38. For this scheme, the protocols used in a conventional link restoration scheme such as the SHN scheme could be used.

A determination is next made in block 40 on whether an alternate route has been found. If yes, the process of locating an alternate route ends. If not, the process continues to the next block 42 to determine whether the time period allocated for link restoration has terminated. If no, the process continues by returning to block 38. For the instant invention, inasmuch as no reverse linking messages could be received from a failed node, chances are that the custodial sender would time out once the predetermined time period runs out, since no alternate route could be found.

Thus, the process next proceeds to block 44 where a special signal is sent to downstream links, and nodes, to initiate the second iteration for the path restoration.

But to effect the path restoration iteration, the communications path in which the failure has occurred needs to be identified. This is done in block 46. Thereafter, the ends nodes of the failed communications path are identified by using a path verification signal, i.e. retrieving the information stored in the nodes relating to the PVCID message mentioned earlier, so as to identify the end nodes. This is done in block 48.

Thereafter, by an arbitration process such as the conventional higher/lower number arbitration process, a second iteration sender and chooser are designated for the path restoration scheme in block 50.

In block 52, the access/egress ports of the respective end nodes of the communications path are likewise identified so that the system can determine where the communications path is to be connected outside of the DTNR domain.

After all of the preparation, the second flooding iteration, i.e. the path restoration scheme, between the sender and chooser nodes is effected at block 54.

In block 56, determination is made on whether alternate paths are found. If none is found, the process proceeds to block 58 to determine whether the time period for path restoration has terminated. If it has not, path restoration continues as the process returns to block 54.

If per block 56 alternate paths are found, then the process proceeds to block 60 where a determination is made on the best alternate path to choose to restore traffic so as to bypass the failure. Likewise, when the time period for the path restoration terminates, the same determination of which of the found alternate paths, if any, is to be used as the alternate path to replace the failed communications path takes place. Thereafter, the process terminates.

While a preferred embodiment of the present invention is disclosed herein for purposes of explanation, numerous changes, modifications, variations, substitutions and equivalents, in whole or in part, should now be apparent to those skilled in the art to which the invention pertains. Accordingly, it is intended that the invention be limited only by the spirit and scope of the appended claims.

I claim:

1. A method of restoring traffic in a telecommunications network having a plurality of interconnected nodes when a failure occurs in a communications path to block traffic passing therethrough, comprising the steps of:

designating one of two nodes sandwiching said failure a custodial sender and the other of said sandwiching nodes a custodial chooser;

effecting link restoration between said custodial sender and said custodial chooser via spare circuits of said network for a first predetermined time period to find an alternate route for said traffic;

identifying the two end nodes of said communications path if said link restoration fails to find said alternate route within said first predetermined time period; and effecting path restoration between said end nodes to find at least one alternate path to reroute said traffic away from said failure.

2. The method of claim 1, wherein said effecting link restoration step further comprises the steps of:

sending link restoration signals from said custodial sender to spare links of said network for said first predetermined time period;

terminating the sending of said link restoration signals if no alternate route configured from interconnected links for restoring said traffic between said custodial sender and said custodial chooser is found within said first predetermined time period.

3. The method of claim 1, wherein said identifying step further comprises the step of:

using a path verification signal for checking the integrity of said communications path to identify said end nodes.

4. The method of claim 1, further comprising the step of:

designating one of said end nodes a sender and the other of said end nodes a chooser;

wherein said effecting path restoration step further comprises the steps of:

said sender flooding spare circuits in said network with path restoration signals;

repeatedly retransmitting said path restoration signals from nodes in said network along the spare circuits interconnecting said sender and said chooser;

said chooser, upon receipt of a first of said path restoration signals, transmitting complementary path restoration signals along paths having spare circuits already flooded with said path restoration signals to configure at least one path for connecting said chooser to said sender so as to reroute said traffic from said failure within a second predetermined time period.

5. The method of claim 1, further comprising the step of:

sending an end node signal to the nodes of said network recognizable only by said two end nodes of said communication path, said end node signal being retransmitted by each node which is not one of said two end nodes to its adjacent nodes;

each of said two end nodes, upon receipt of said end node signal, transmitting an arbitration signal to the other end node to determine which one of said end nodes is to become said sender and which one of said end nodes is to become said chooser for effecting said path restoration.

6. The method of claim 4, further comprising the step of:
selecting the shortest path between said sender and said chooser for restoring said communications path for routing said traffic.

7. System for restoring traffic in a telecommunications network having a plurality of interconnected nodes when a failure occurs in a communications path to block traffic passing therethrough, comprising:
a first of the nodes sandwiching said failure being designated a custodial sender;
the other of said nodes sandwiching said failure being designated a custodial chooser;
means for effecting link restoration between said custodial sender and said custodial chooser via spare circuits of said network for a first predetermined time period to find an alternate route for said traffic;
means for identifying the two end nodes of said communications path if said link restoration fails to find said alternate route within said first predetermined time period; and
means for effecting path restoration between said two end nodes to find at least one alternate path to reroute said traffic away from said failure.

8. System of claim 7, wherein said means for effecting link restoration further comprises:
means for sending link restoration signals from said custodial sender to spare links of said network for said first predetermined time period, said sending means terminating the sending of said link restoration signals if no alternate route configured from interconnected links for restoring said traffic between said custodial sender and said custodial chooser is found within said first predetermined time period.

9. System of claim 7, wherein at least one of said end nodes sends out a path verification signal to the various nodes along the paths interconnecting said two end nodes to check the integrity of said communications path in said network.

10. System of claim 7, further comprising:
means for sending an end node signal to the nodes of said network recognizable only by said two end nodes of said communication path, said end node signal being retransmitted by each node which is not one of said two end nodes to its adjacent nodes, said two end nodes, upon receipt of said end node signal, arbitrating among themselves on which is to be a sender and which is to be a chooser for effecting said path restoration.

11. A method of restoring traffic in a telecommunications network having a plurality of interconnected nodes when a node through which traffic passes fails, comprising the steps of:
designating a first of the nodes sandwiching said failed node a custodial sender and the other a custodial chooser;
effecting link restoration between said custodial sender and said custodial chooser within a first time period;
determining communications path in said network to which said failed node is a part of;
identifying the two end nodes of said communications path in said network if no alternate route is found between said custodial sender and said custodial chooser by said link restoration; and
effecting path restoration between said two end nodes to find at least one alternate path to replace said communications path.

12. The method of claim 11, wherein said effecting link restoration step further comprises the steps of:
sending link restoration signals from said custodial sender to spare links of said network for said first predetermined time period;
terminating the sending of said link restoration signals if no alternate route configured from interconnected links for restoring said traffic between said custodial sender and said custodial chooser is found within said first predetermined time period.

13. The method of claim 11, wherein said identifying step further comprises the step of:
using a path verification signal sent by at least one of said end nodes to the various nodes along paths interconnecting said two end nodes for checking the integrity of said communications path in said network to identify said end nodes.

14. The method of claim 11, wherein said effecting path restoration step further comprises the steps of:
designating one of said end nodes a sender and the other of said end nodes a chooser;
flooding spare circuits in said network with path restoration signals by said sender;
repeatedly retransmitting said path restoration signals from nodes in said network along the spare circuits interconnecting said sender and said chooser;
transmitting complementary path restoration signals by said chooser, upon receipt of a first of said path restoration signals, along paths having spare circuits already flooded with said path restoration signals to configure at least one path for connecting said chooser to said sender so as to reroute said traffic from said failed node within a second predetermined time period.

15. The method of claim 11, further comprising the step of:
sending an end node signal to the nodes of said network recognizable only by said two end nodes of said communication path, said end node signal being retransmitted by each node which is not one of said two end nodes to its adjacent nodes;
transmitting an arbitration signal by each of said two end nodes, upon receipt of said end node signal, to the other end node to determine which one of said end nodes is to become a sender and which one of said end nodes is to become a chooser for effecting said path restoration.

16. The method of claim 14, further comprising the step of:
selecting the shortest path between said two end ports for restoring said communications path for routing said traffic.

17. Apparatus for restoring traffic in a telecommunications network having a plurality of interconnected nodes when a node through which traffic passes fails, comprising:
means for designating a first of the nodes sandwiching said failed node a custodial sender and the other a custodial chooser;
means for effecting link restoration between said custodial sender and said custodial chooser within a first time period;
means for determining communications path in said network to which said failed node is a part of;

means for identifying the two end nodes for said communications path in said network if no alternate route is found between said custodial sender and said custodial chooser by said link restoration; and means for effecting path restoration between said two end nodes to find at least one alternate path to replace said communications path.

18. Apparatus of claim 17, wherein said means for effecting link restoration further comprises:

means for sending link restoration signals from said custodial sender to spare links of said network for said first predetermined time period, said sending means terminating the sending of said link restoration signals if no alternate route configured from interconnected links for restoring said traffic between said custodial sender and said custodial chooser is found within said first predetermined time period.

19. Apparatus of claim 17, wherein at least one of said two end nodes sends a path verification signal to the various nodes along the paths interconnecting said two end nodes to check the integrity of said communications path in said network.

20. Apparatus of claim 17, further comprising:

means for sending an end node signal to the nodes of said network recognizable only by said two end nodes of said communication path, said end node signal being retransmitted by each node which is not one of said two end nodes to its adjacent nodes;

said two end nodes, upon receipt of said end node signal, arbitrating among themselves to determine which is to become a sender and which is to become a chooser for effecting said path restoration.

21. Apparatus of claim 17, wherein each of said two end nodes is a digital cross connect switch comprising at least one access/egress port through which traffic from said communications path of said network is traversable to another telecommunications network.

22. Apparatus of claim 17, wherein each of said nodes is a digital cross connect switch each having a plurality of circuits for configuring multiple communications paths.

* * * * *